United States Patent Office 2,736,643
Patented Feb. 28, 1956

2,736,643

APPLICATION OF HORMONES TO THE PRODUCTION OF EDIBLE BEAN SPROUTS

Charles F. Pentler and Fumiko Murayama, San Francisco, Calif.

No Drawing. Application April 18, 1952, Serial No. 283,123

10 Claims. (Cl. 71—2.1)

This invention relates to a method of treating edible seeds, such as beans, with chemical growth-regulating substances, whereby the growth of the sprouts may be controlled as to shape, size and length.

A further object is to provide a method which may be used in conjunction with the growing of seed sprouts under submerged conditions as described in our patent application Serial No. 247,762, now U. S. Patent No. 2,677,217, issued May 4, 1954.

A further object is to provide a method of controlling the growth to a nicety by bathing the sprouts with chemical growth-regulating substances, thereby producing results not possible when chemical growth regulating substances are applied to limited regions of the sprouts such as the roots alone or are applied in a haphazard manner as would occur by sprinkling or smearing the sprouts with chemical growth-regulating substances.

A further object is to provide a method of producing smaller, fatter sprouts which can be harvested younger and therefore will have superlative flavor, crispness and crunchiness as well as a maximum amount of vitamins, enzymes and solids.

In the culture of edible bean and other seed sprouts heretofore it has been customary to germinate the seeds in dark rooms or covered containers, usually on or between damp bedding surfaces such as the surfaces of mats, cloth, porous ceramic material, or blotting paper.

Applicants have found, as described in patent application Serial No. 247,762, that a very satisfactory method of growing sprouts of edible seeds is to grow them in aerated water and in the absence of light. This causes the seeds to absorb oxygen from the aerated water and to grow rapidly and uniformly.

Applicants have in addition found a method for controlling the growth of the sprouts by bathing the sprouts with chemical growth-regulating substances. In this manner, the development of the sprouts can be controlled to a very high degree. The value of achieving this control will be explained as follows.

It is important to sprout the seeds sufficiently to secure vigorous growth and the production of large amounts of vitamins, enzymes, etc., but it is also important that the sprouts should be kept short and fat and harvested as young as possible. The sprouts should be kept as small as is consistent with the other objectives and harvested as young as possible because, when seeds are sprouted in the dark, they consume their own substance and they actually burn up their own solids in order to provide the energy necessary for their life and growth. Therefore, if the initial weights of the seeds and the other factors are equal, and if very large sprouts are produced, these large sprouts will have consumed a large amount of their own substance in order to provide energy for their growth and these sprouts will contain a greater proportion of water and a lesser total amount of solids than smaller sprouts. Smaller sprouts, on the other hand, would contain a lesser proportion of water and a greater total amount of solids than larger sprouts. For this reason, the cotyledons (the two halves of the seed which spread apart as the sprout grows) of the smaller sprouts would be more crunchy and the hypocotyls (the fat portion of the sprouts) of the smaller sprouts would be more crisp when raw and more firm-bodied when cooked.

It is also very desirable to have the roots as short as possible. The roots of seed sprouts tend to become long and threadlike or hairlike. They frequently become discolored and are decidedly unappetizing because of this discoloration and their long and hairlike character. In China, where sufficient labor is available, the roots are sometimes removed individually by hand, but of course this would not be a practicable expenditure of labor in the United States. Further, it is undesirable to remove the roots because this produces a serious injury to the sprouts and opens the way for bacterial invasion, thus reducing the possibility of delivering the sprouts to the consumer in a vigorous, viable condition.

Difficulty is caused by the fact that the roots develop before the hypocotyls and thereafter they tend to retain their initial advantage in growth. Indeed, the roots are necessary for the growth and life processes of the sprouts, but it is not necessary to have such long and threadlike roots. However, in order to produce shorter roots, as well as to produce short, fat sprouts with high solids, it would be necessary to change the entire growth pattern of the sprouts.

The new method consists of bathing the entire surface of the sprouts with chemical growth regulating substances. Ordinary methods of sprinkling or smearing the sprouts with chemical growth-regulating substances in a haphazard manner, or of applying chemical growth-regulating substances to limited regions such as the roots, produced results so unsatisfactory as to tend to discourage further investigation. However, the applicants discovered that satisfactory results were obtained when the sprouts were bathed with water containing chemical growth-regulating substances, thus applying chemical growth-regulating substances in a uniform manner to the entire surface of the sprouts. The reason for the effectiveness of this new method is probably that it is no longer necessary to depend upon the internal biological transport mechanisms of the sprouts to carry the chemical growth-regulating substances from one region of the sprouts to another region, for example from the roots to the cotyledons, and thereby it is possible to avoid undesirable actions that occur while the chemical growth regulating substances are in transit within the sprouts. Further, it is possible to avoid undesirable local actions that are produced when much larger quantities of chemical growth-regulating substances are applied to limited areas or regions of the sprouts in an attempt to affect the overall growth pattern.

The applicants discovered that this method could be further refined by using it in combination with the method for growing the seed sprouts under submerged conditions that was described in patent application Serial No. 247,762. When chemical growth-regulating substances are added to the aerated water in which the sprouts are submerged and grown, the entire physical and chemical environment of the sprouts is brought under very accurate control and the relationship between the sprouts and the chemical growth-regulating substances may be most delicately controlled in such a way that the two methods are much more effective when used in combination than when they are used in sequence or separately. A further reason for the increased effectiveness of the two methods when they are used in combination is that the prolonged and favorable nature of the contact between the chemical growth-regulating substances and sprouts makes it possible to use exceedingly small quantities of the chemical growth-regulating substances and this has the very important advantage that the specific action of the chemical growth-regulating substances stops very rapidly when the solutions are removed. Therefore, the action of the chemical growth-regulating substances can be stopped or changed at exactly the right time for the most effective manipulation of the development of the sprouts. Growth may be immediately continued with other chemical growth-regulating substances or in air or in aerated water without chemical growth-regulating substances and there are no difficulties caused by the carry-over of chemical growth-regulating substances that were used earlier in the process.

Sprouts of many different and desirable characteristics can be produced by bathing the sprouts with chemical growth-regulating substances, especially when this procedure is used in skillful combination with the procedure for growing the sprouts under submerged conditions. For example, we can use portions of the same lot of mung bean seeds and produce sprouts with hypocotyl lengths of ⅜ inch to 4 inches, hypocotyl diameters of 1/32 inch to more than ⅛ inch, and root lengths of ½ inch to 5 inches, all these characteristics being variable largely independently of each other. Further, we can change the character of the root from long and thread-like to short and tapering and we can largely suppress the production of brown, corky roots and branch roots, all by correct use of the proper chemical growth-regulating substances and the correct combination of procedures.

Following is an example of the use of our new methods in order to produce edible seed sprouts of very desirable characteristics. These are very crisp and crunchy sprouts, with short light-colored tapering roots, relatively large hypocotyls, fine flavor and a high content of vitamins, enzymes and solids.

First, suitable seeds such as the seeds of mung beans (Phaseolus aureus) are covered with water and are soaked for several hours without aeration. Chemical growth-regulating substances may be used at this time, but it is not essential to do so. The seeds swell and the sprouts begin to grow but growth soon stops because the next stage of their development requires large amounts of oxygen. The seeds begin to grow at different times, but they all stop at the same stage of development. In this way they are brought into a uniform condition for further germination and treatments.

Second, the seeds are submerged in strongly aerated water (approximately one quart of water for each ounce of the original dry weight of the seeds) in a container from which light is substantially excluded and they are grown for approximately 18 to 30 hours at a temperature in the neighborhood of 75 to 85 degrees Fahrenheit. Chemical growth-regulating substances may be used at this time, but it is not essential to do so. At the end of this period, the seed coats which have separated are skimmed from the surface of the water and the sprouts are drained and washed.

Third, the sprouts are submerged in strongly aerated water and growth is continued for approximately 18 to 30 hours under similar conditions of temperature, aeration and darkness, except that a chemical growth-regulating substance, or mixture of chemical growth-regulating substances, is added which stimulates the sprouts to grow in the region of the hypocotyl and reduces the rate of elongation in the region of the root without causing the production of brown, corky roots or branch roots or other undesirable side effects. Suitable chemical growth-regulating substances for this purpose have been found to be chemical substances such as halogenated and methylated phenoxyaliphatic acids and derivatives, for example 2,4-dichlorophenoxyacetic acid which exerts an optimal effect under the conditions just described at a concentration of approximately 0.02 to 0.40 part by weight of 2,4-dichlorophenoxyacetic acid per million parts by weight of water. At the end of this period, the sprouts are drained and washed.

Fourth, the sprouts are submerged in strongly aerated water and growth is continued for approximately 12 to 24 hours under similar conditions of temperature, aeration and darkness, except that a chemical growth-regulating substance, or mixture of chemical growth-regulating substances, is added which stimulates the sprouts to grow in the region of the hypocotyl and almost completely suppresses the elongation of the root without causing the production of brown, corky roots or branch roots or other undesirable side effects. Suitable chemical growth-regulating substances for this purpose have been found to be chemical substances such as naphthoxyaliphatic acids and derivatives, for examples beta-naphthoxyacetic acid which exerts an optimal effect under the conditions just described at a concentration of approximately 0.20 to 4.00 parts by weight of beta-naphthoxyacetic acid per million parts by weight of water. The sprouts are observed at regular intervals toward the end of this period of growth. When the desired hypocotyl dimensions have been attained, the sprouts are drained and washed. It is to be here noted that in step 4 the rate of growth has been further reduced from that in step 3 but not sufficiently to completely stop the root growth, which would be detrimental, causing the death of the seed and hypocotyl.

The sprouts are now ready for market and may be placed in packages. If the sprouts are to be stored for several days or longer, they should be permitted to receive some air and should be kept in a cool place, away from the light. Under such conditions, they will retain their unique characteristics and will remain in a vigorous living condition until they are consumed as raw vegetables in a salad, or are sauted or stewed or otherwise cooked.

Having thus described our invention, we claim:

1. In the method of controlling the growth pattern of edible seed sprouts in separate growth stages the steps comprising one stage of submerging the seed sprouts in aerated water containing 0.02 to 0.40 part by weight of 2,4-dichlorophenoxyacetic acid per million part by weight of water, maintaining the water at a temperature of about 75° to 85° Fahrenheit, continuing seed sprout growth for a period of about 18 to about 30 hours substantially in the absence of light, and a subsequent stage of submerging the seed sprouts in aerated water containing 0.20 to 4.00 parts by weight beta-naphthoxyacetic acid per million parts by weight of water, maintaining the water of the subsequent stage at a temperature of about 75° to 85° Fahrenheit, and continuing the seed sprout growth for a period of about 12 hours to 24 hours substantially in the absence of light.

2. The process of changing the growth pattern of seed sprouts by a combination of growth stages comprising a first step of covering seed with water, germinating seed sprout growth to a uniform condition, a second step of re-submerging the seed sprout in a strongly aerated water, growing the seed sprouts substantially in the absence of light for approximately 18 to 30 hours in the aerated water, maintaining the temperature of the aerated water on the order of 75° to 85° Fahrenheit, separating the seed coats from the sprouts, draining and washing the sprouts, a third step of resubmerging the seed sprouts in water containing a hypocotyl chemical growth-regulating substance selected from the class of halogenated and methylated phenoxyaliphatic acids and derivatives, continuing seed sprout growth for a period of approximately 18 to 30 hours, maintaining the condition of temperature and absence of light provided in the second step, draining and re-washing the seed sprouts, and as a final step re-submerging the seed sprouts in water containing a seed sprout stimulant and root suppressing chemical growth-regulating substance selected from the class of naphthoxyaliphatic acids and derivatives, continuing seed sprout growth for a period of approximately 12 to 24 hours, maintaining the condition of temperature and absence of light provided in the second step, and harvesting the sprouts.

3. In the method of claim 2 the hypocotyl chemical growth-regulating substance contained in the water of the third seed sprout growth stage being 2,4-dichlorophenoxyacetic acid in the approximate concentration of 0.02 to 0.40 part by weight per million parts by weight of water.

4. In the method of claim 2 the seed sprout stimulant and root suppressing chemical growth-regulating substance contained in the water of the final seed sprout growth stage being beta-naphthoxyacetic acid in the approximate concentration of 0.20 to 4.00 parts by weight per million parts by weight of water.

5. In the method of changing the growth pattern of edible seed sprouts during germination and growth substantially in the absence of light and open air the steps comprising a first stage of stimulating hypocotyl growth in a water solution containing a chemical growth-regulating substance selected from the class of halogenated and methylated phenoxyaliphatic acids and derivatives, and a following stage of stimulating seed sprout growth and suppressing root growth in a water solution containing a chemical growth-regulating substance selected from the class of naphthoxyaliphatic acids and derivatives.

6. In the method of claim 5, the halogenated phenoxyaliphatic acid derivative being 2,4-dichlorophenoxyacetic acid and the naphthoxyaliphatic acid derivative being beta-naphthoxyacetic acid.

7. The method of controlling the growth pattern of growing edible seed sprouts which comprises growing the sprouts in the presence of a seed sprout stimulant and root suppressing chemical growth-regulating substance selected from the class of naphthoxyaliphatic acids and derivatives.

8. In the method of claim 7, the naphthoxyaliphatic acid being beta-naphthoxyacetic acid.

9. In the method of controlling the growth pattern during the growing stage of edible seed sprouts by changing growth stages of the seed sprouts comprising the step of chemically stimulating hypocotyl growth followed by the step of chemically stimulating seed sprout growth and simultaneously suppressing root growth.

10. In the method of claim 9, the edible seed sprouts comprising bean sprouts.

References Cited in the file of this patent

UNITED STATES PATENTS

| | | |
|---|---|---|
| 2,436,652 | Lee | Feb. 24, 1948 |
| 2,522,409 | Stoller | Sept. 12, 1950 |
| 2,677,217 | Pentler et al. | May 4, 1954 |

OTHER REFERENCES

Allison et al.: Am. Jour. Botany, vol. 10, December 1923, pp. 554–566.